(12) United States Patent
Shavit et al.

(10) Patent No.: US 7,809,916 B1
(45) Date of Patent: Oct. 5, 2010

(54) METHOD FOR DYNAMICALLY REFINING LOCKS IN RESIZABLE CONCURRENT HASHING

(75) Inventors: Nir N. Shavit, Cambridge, MA (US); Maurice P. Herlihy, Brookline, MA (US)

(73) Assignee: Oracle America, Inc., Redwood City, CA (US)

( * ) Notice: Subject to any disclaimer, the term of this patent is extended or adjusted under 35 U.S.C. 154(b) by 468 days.

(21) Appl. No.: 11/863,901

(22) Filed: Sep. 28, 2007

(51) Int. Cl.
*G06F 12/06* (2006.01)
(52) U.S. Cl. ............... 711/170; 711/206; 711/216; 711/E12.023
(58) Field of Classification Search ............ 711/170, 711/156, 216, 206, 201, 217, E12.023; 707/E17.007, 707/E17.036
See application file for complete search history.

(56) References Cited

U.S. PATENT DOCUMENTS

| | | | |
|---|---|---|---|
| 6,578,131 B1 * | 6/2003 | Larson et al. | 711/216 |
| 7,085,911 B2 * | 8/2006 | Sachedina et al. | 711/206 |
| 7,287,131 B1 * | 10/2007 | Martin et al. | 707/E17.007 |

OTHER PUBLICATIONS

"Split-Ordered Lists—Lock-free Resizable Hash Tables", by Ori Shalev et al., Proceedings of the Twenty-Second ACM Symposium on Principles of Distributed Computing, pp. 102-111, Jul. 13-16, 2003, Boston Massachusetts.*

Boyer, John. "Resizable Data Structures," Dr. Dobb's Journal, Jan. 1998, pp. 115-116, 118, 129.*

Witobl Litwin "Virtual Hashing: A Dynamically Changing Hashing," p. (517-523) Sep. 1978.*

Griswold, William G. and Townsend, Gregg M. "The Design and Implementation of Dynamic Hashing for Sets and Table in Icon," Software—Practice and Experience, Apr. 1993, pp. 351-367.*

* cited by examiner

*Primary Examiner*—Pierre-Michel Bataille
(74) *Attorney, Agent, or Firm*—Brooks Kushman P.C.

(57) ABSTRACT

Methods and apparatus provide a lock resizer for resizing of a lock array of a lock-based concurrent hash table. The lock resizer provides a data structure with memory locations which is apportioned into buckets that contain a plurality of the memory locations. It is understood that the data structure can dynamically add new memory locations. The lock resizer further provides a location lock for each distinct memory location and a bucket lock for each distinct bucket. A resizing flag can reference a thread to indicate whether or not the thread is resizing the amount of locks. Upon detection of the existence of a policy condition, the lock resizer resizes the amount of location locks and/or bucket locks in order to create new location locks and new bucket locks, thereby ensuring that as new memory locations are added, all buckets can contain up to a fixed number of memory locations.

20 Claims, 6 Drawing Sheets

440 ALLOW THE FIRST THREAD TO ACQUIRE THE LOCATION LOCK.

510 UPON ACQUIRING THE LOCATION LOCK FOR THE SOUGHT AFTER MEMORY LOCATION, INITIATE A SECOND VERIFICATION TO DETERMINE IF THE AMOUNT OF LOCATION LOCKS AND BUCKET LOCKS IS BEING RESIZED BY ANY OF THE COMPETING THREADS.

520 REQUIRE THE FIRST THREAD TO RELEASE THE LOCATION LOCK ACQUIRED BY THE FIRST THREAD IF THE SECOND VERIFICATION DETERMINES THAT ANY OF THE COMPETING THREADS IS REFERENCED BY THE THREAD REFERENCE OF THE RESIZING FLAG, THEREBY INDICATING THAT THE AMOUNT OF LOCATION LOCKS AND BUCKET LOCKS IS BEING RESIZED.

530 AFTER RELEASING THE ACQUIRED LOCATION LOCK, ALLOW THE FIRST THREAD TO ATTEMPT TO REACQUIRE THE LOCATION LOCK THAT HAS BEEN RELEASED BY THE FIRST THREAD.

540 WHEN NO COMPETING THREAD IS REFERENCED BY THE THREAD REFERENCE OF THE RESIZING FLAG, REACQUIRE THE LOCATION LOCK THAT HAS BEEN RELEASED BY THE FIRST THREAD.

550 REINITIATING THE SECOND VERIFICATION SO THAT WHEN ANY OF THE COMPETING THREADS IS REFERENCED BY THE THREAD REFERENCE OF THE RESIZING FLAG, THE FIRST THREAD SPINS UNTIL THE THREAD REFERENCE OF THE RESIZING FLAG DOES NOT REFERENCE ANY COMPETING THREADS.

FIG. 5

METHOD FOR DYNAMICALLY REFINING LOCKS IN RESIZABLE CONCURRENT HASHING

BACKGROUND

Hashing is a technique commonly used in sequential set implementations to ensure that these method calls take constant time on the average. A hash set (sometimes called a hash table) is an efficient way to implement sets of items. A hash set is typically implemented as an array, called the table. Each table element is a reference to one or more items. A hash function maps items to integers so that distinct items almost always map to distinct values. Java provides each object with a hashCodeQ method that serves this purpose. To add, remove, or test an item for membership, the hash function is applied to the item (e.g. modulo the table size) to identify the table entry associated with that item. This is known as hashing the item. In conventional hash-based set algorithms, each table element refers to a single item, which is an approach known as open addressing. In closed addressing, each table element refers to a set of items, traditionally called a bucket.

Any hash set algorithm must deal with collisions and determine what to do when two distinct items hash to the same table entry. Open-addressing algorithms typically resolve collisions by applying alternative hash functions to test alternative table elements. Closed-addressing algorithms place colliding items in the same bucket, until that bucket becomes too full. In both kinds of algorithms, it is sometimes necessary to resize the table. In open-addressing algorithms, the table may become too full to find alternative table entries and buckets may become too large to search efficiently in closed-addressing algorithms Conventional hashing suffers from a variety of problems when it is applied to multicore or multithread processors that are increasingly common in computer systems. In fact, conventional hash tables are playing an increasingly important role as search structures for concurrent programs by providing search functionality with low cache coherence overheads. Such conventional hash tables are also being used extensively in state of the art virtual machines and software transactional memories. Increasingly, resizing these conventional hash tables is an important challenge since these structures tend to grow significantly with use over time.

Specifically, a problem exists with all current resizable lock-based hash tables, including the ones in the Java concurrency package. Such conventional implementations resize the hash table bucket structure but not the set of locks that protect the buckets. Instead, an approach is used where a given lock protects several buckets. As the table increases in size, the fixed set of locks is forced to protect a growing number of buckets. Eventually, contention for these locks among competing threads will take a toll on performance as multiple threads seek access to the ever growing number buckets that each lock is forced to protect.

SUMMARY

Embodiments disclosed herein provide for a lock resizer that allows for resizing of a lock array for a lock-based concurrent hash table. Specifically, the number of locks can be repeatedly resized, thereby allowing the locks associated with a hash table to maintain a fixed stripe size. Hence, the load on the locks does not increase as the size of the hash table itself increases. Such embodiments can be applied to both an open and a closed address concurrent hash table.

According to general embodiments, the lock resizer provides a data structure with memory locations which is apportioned into buckets where each bucket can contain a plurality of the memory locations. It is understood that the data structure can dynamically add new memory locations. The lock resizer further provides a location lock for each distinct memory location and a bucket lock for each distinct bucket. A resizing flag includes a thread reference in order to indicate whether or not a particular thread is resizing the amount of locks. Upon detection of the existence of a policy condition, the lock resizer resizes the amount of location locks and/or bucket locks in order to create new location locks and new bucket locks, thereby ensuring that as the data structure dynamically adds new memory locations, all buckets can contain up to a fixed number of memory locations.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations may be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein may be employed in computerized devices and software systems for such devices such as those manufactured by Sun Microsystems, Inc. of Santa Clara, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 5 is a flowchart of processing steps performed by a lock resizer to reacquire a location lock by a thread after the thread has released the locations lock according to embodiments herein.

DETAILED DESCRIPTION

Methods and apparatus provide a lock resizer for resizing of a lock array of a lock-based concurrent hash table. The lock resizer provides a data structure (e.g. a hash table) with memory locations which is apportioned into buckets that contain a plurality of the memory locations. It is understood that the data structure can dynamically add new memory locations. The lock resizer further provides a location lock for each distinct memory location and a bucket lock for each distinct bucket. A resizing flag can reference a thread to indicate whether or not the thread is resizing the amount of locks. Upon detection of the existence of a policy condition, the lock resizer resizes the amount of location locks and/or bucket locks in order to create new location locks and new bucket locks, thereby ensuring that as new memory locations are added, all buckets can contain up to a fixed number of memory locations.

Figure 1:
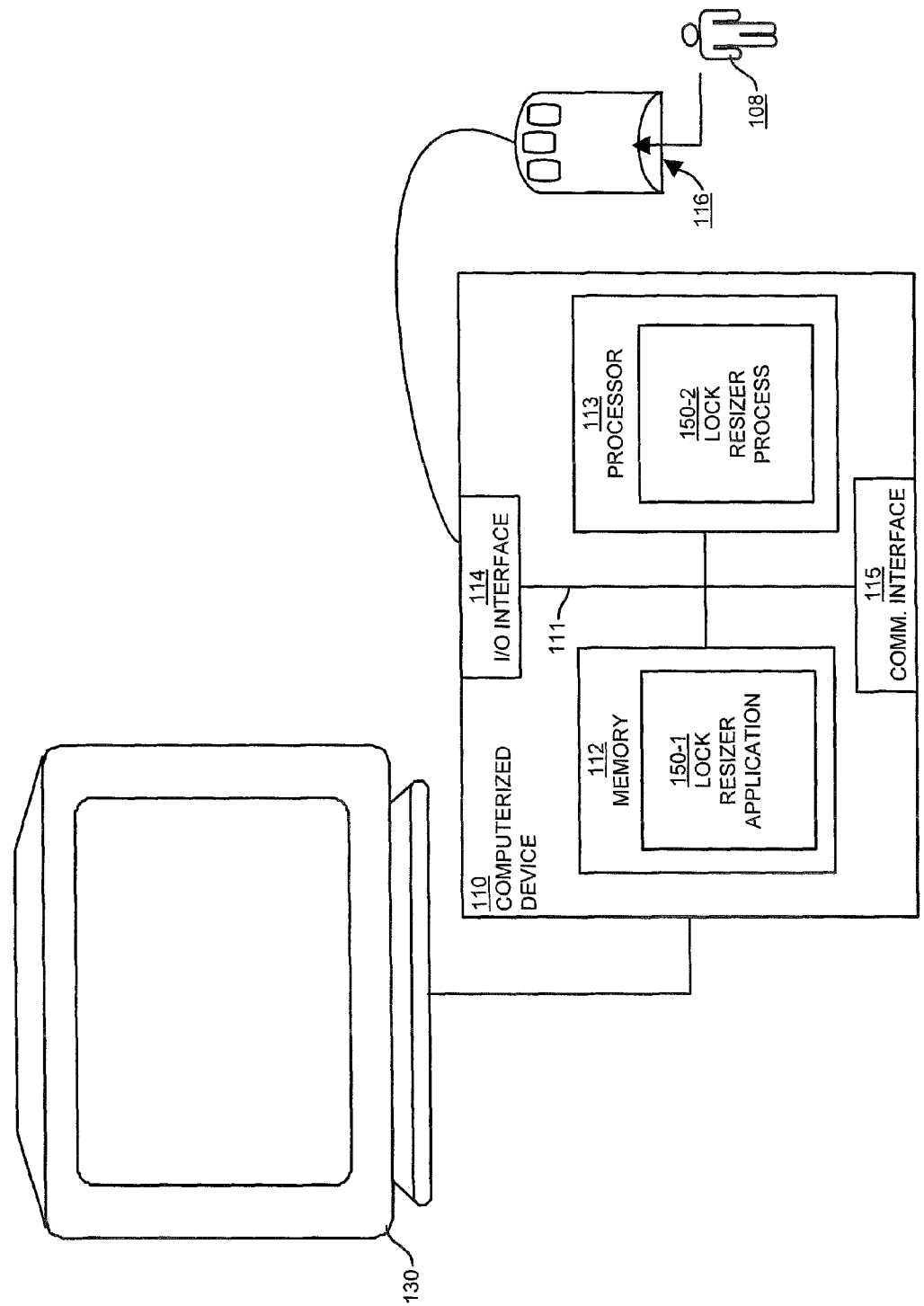
FIG. 1 illustrates an example computer system architecture for a computer system according to one embodiment disclosed herein.

Turning now to FIG. 1, a block diagram illustrates an example of architecture for a computer system 110 that executes, runs, interprets, operates or otherwise performs an lock resizer application 150-1 and/or lock resizer process 150-2 (e.g. an executing version of the application 150-1 controlled by user 108) according to embodiments herein. The computer system 110 may be any type of computerized device such as a personal computer, a client computer system, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130 presenting a graphical user interface 205 of the lock resizer 150. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. Further, aspects of the lock resizer application 150-1 and/or the lock resizer process 150-2 can be distributed over a networked environment.

The memory system 112 can be any type of computer readable medium and, in this example, is encoded with an lock resizer application 150-1 that supports generation, display, and implementation of functional operations as will be further explained herein. During operation of the computer system 110, the processor 113 accesses the memory system 112 via the interconnect 111 in order to launch, run, execute, interpret or otherwise perform the logic instructions of the lock resizer application 150-1. Execution of the lock resizer application 150-1 in this manner produces the lock resizer process 150-2. In other words, the lock resizer process 150-2 represents one or more portions or runtime instances of the lock resizer application 150-1 (or the entire application 150-1) performing or executing within or upon the processor 113 in the computerized device 110 at runtime.

Those skilled in the art will understand that the computer system 110 may include other processes and/or software and hardware components, such as an operating system not shown in this example. A display 130 need not be coupled directly to computer system 110. For example, the lock resizer application 150-1 can be executed on a remotely accessible computerized device via the network interface 115. In this instance, the graphical user interface 104 may be displayed locally to a user 108 of the remote computer, and execution of the processing herein may be client-server based.

During operation of the computer system 110, the processor 113 accesses the memory system 112 via the interconnect 111 in launch, run, execute, interpret or otherwise perform the logic instructions of the lock resizer application 150-1. Execution of the lock resizer application 150-1 in this manner produces processing functionality in an lock resizer process 150-2. In other words, the lock resizer process 150-2 represents one or more portions or runtime instances of the lock resizer application 150-1 (or the entire targeted advertisement application 150-1) performing or executing within or upon the processor 113 in the computerized device 110 at runtime.

With regard to the flowcharts 300-600 illustrating embodiments of the lock resizer 150, the rectangular elements of FIGS. 3-6 are herein denoted "processing blocks" and represent computer software instructions or groups of instructions upon a computer readable medium. Alternatively, the processing blocks represent steps performed by functionally equivalent circuits such as a digital signal processor circuit or an application specific integrated circuit (ASIC). The flowcharts do not depict the syntax of any particular programming language.

Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order. In addition, FIGS. 3-6 are discussed in relation to example computer code included herein which is referred to throughout the discussions of FIGS. 3-6.

Figure 2:
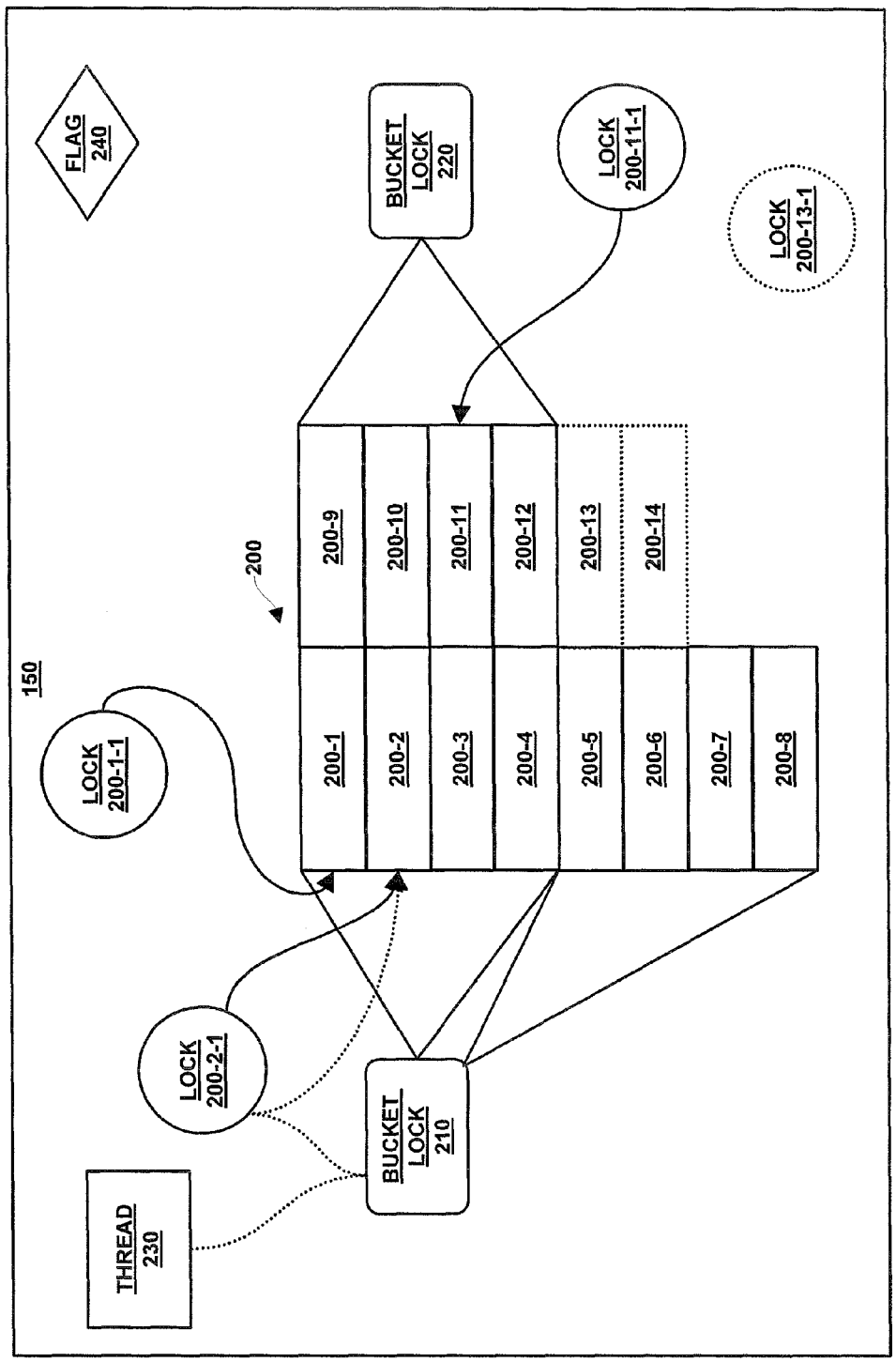
FIG. 2 is a block diagram of a hash table acted upon by the lock resizer according to embodiments herein.
Figure 3:
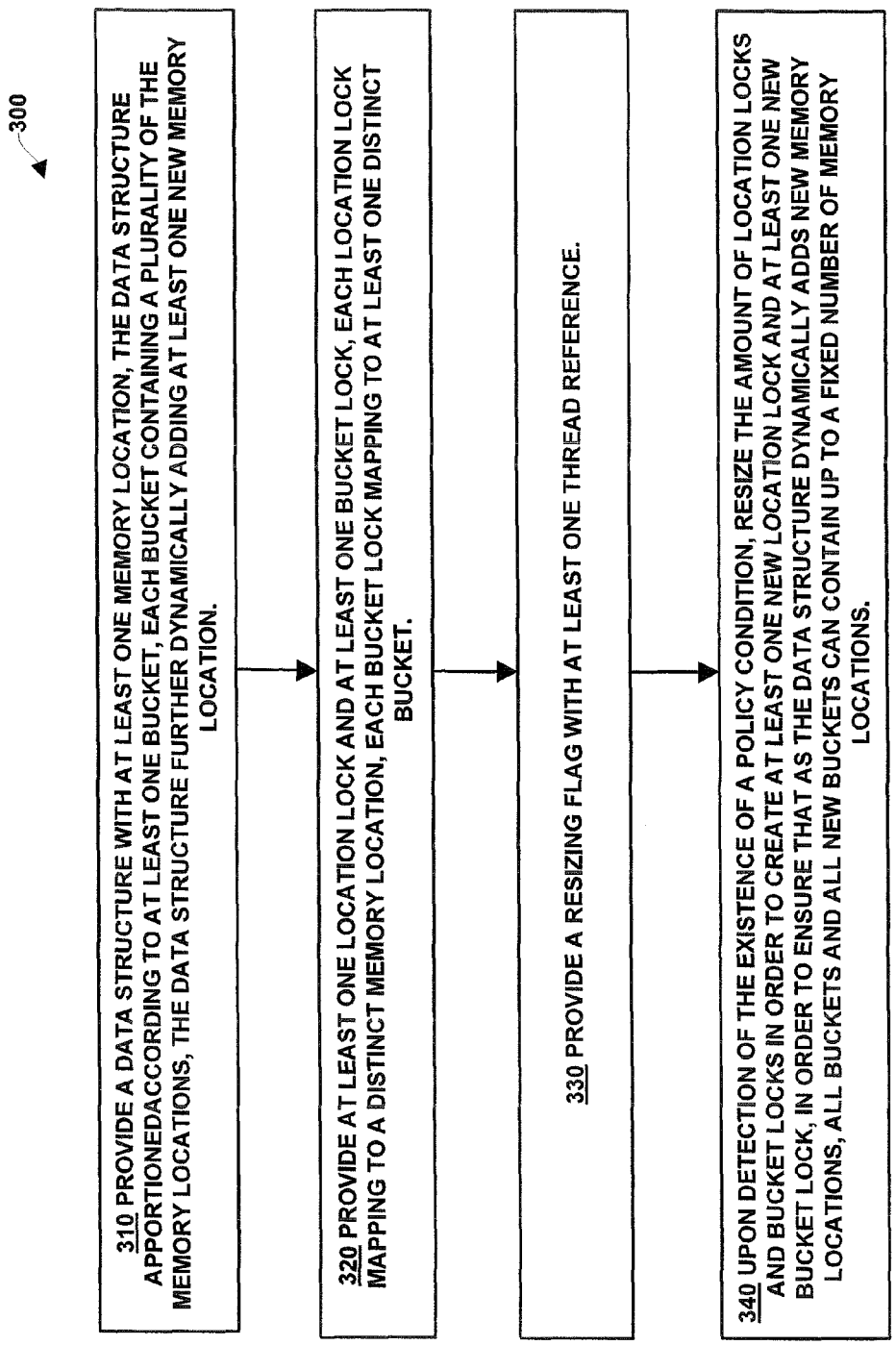
FIG. 3 is a flowchart of processing steps performed by a lock resizer to ensure that as the data structure dynamically adds new memory locations, all buckets and all new buckets can contain up to a fixed number of memory locations according to embodiments herein.

FIG. 2 is a block diagram of the lock resizer 150 according to embodiments herein. Additionally, FIG. 3 is a flowchart 300 of processing steps performed by the lock resizer 150 to ensure that as the data structure dynamically adds new memory locations, all buckets and all new buckets can contain up to a fixed number of memory locations according to embodiments herein. The processing steps of flowchart 300 are herein discussed with reference to aspects of the lock resizer 150 illustrated in FIG. 2.

As illustrated in FIG. 2, the lock resizer 150 allows a thread 230 to lock a bucket 210 which contains four memory locations 200-1 . . . 200-4 and to also acquire a location lock 200-2-1 for a sought after memory location 200-2. The thread 230 acquires the location lock 200-2-1 when the reference flag 240 indicates that no competing threads are resizing the amount locks (i.e. bucket locks and/or location locks). If the resizing flag is not referencing any competing thread, then locks acquired by the thread 230 will have up-to-date mappings to memory locations in the hash table 200. If the resizing flag is referencing a competing thread, then any locks acquired by the thread 230 will have to be released because a competing thread is currently resizing the locks. As the locks are resized, there is a possibility that the locks acquired by the thread 230 will be remapped to different memory locations and buckets. Hence, such remapped locks would not be useful to the thread 230.

Since the hash table 200 has added new memory locations 200-13, 200-14, the thread 230 can resize the number of locks. Once the locks are resized, later threads will be able to access bucket locks and location locks that map to the newly created memory locations 200-13, 200-14. However, while the thread 230 is in the process of resizing the locks, the resizing flag 240 will reference the thread 230 in order to indicate to competing threads that a resizing of the locks is underway.

It is understood that the number of buckets, bucket locks, memory locations and location locks in FIG. 2 is intended to merely be an example. Thus, the lock resizer 150 can provide any number of bucket locks and location locks for a data structure 200 that contains any amount of memory locations. Moreover, although not depicted, the bucket locks 210, 220 and location locks 200-1-1, 200-2-1, 200-11-1 and 200-13-1 can be organized within a lock array. Thus, when a thread 230 is in charge of resizing the number of locks, it is implicit that the lock array will be compatible with the lock resizing.

At step 310 of FIG. 3, the lock resizer 150 provides a data structure 200 with memory locations 200-1 to 200-14, the data structure 200 is apportioned according buckets 210, 220 of memory locations. Each bucket associated with the hash table 200 can include up to four memory locations even as the hash table 200 dynamically adds new memory locations 200-13, 200-14.

At step 320, the lock resizer 150 provides location locks and bucket locks. Each location lock maps to distinct memory locations and each bucket lock maps to distinct buckets. With respect to hash table 200, a bucket lock 210 controls access to two distinct buckets. Bucket lock 210 can lock a bucket of four memory locations 200-1 to 200-4 and can lock another bucket of four memory locations 200-5 to 200-8. Bucket lock 220 locks a bucket of memory locations 200-9 to 200-12. Each memory location 200-1 to 200-14 of the hash table 200 can have its own location lock as well, such as depicted locks 200-1-1, 200-2-1, 200-11-1, 200-13-1.

At step 330, the lock resizer 150 provides a resizing flag 240 which includes a reference to a thread. At step 340, upon detection of the existence of a policy condition, the lock resizer 150 resizes the amount of location and bucket locks in order to create new location locks and new bucket locks. Thus, the lock resizer 150 ensures that as the data structure 200 dynamically adds new memory locations, all buckets and all new buckets can contain up to a fixed number of memory locations.

Figure 4:
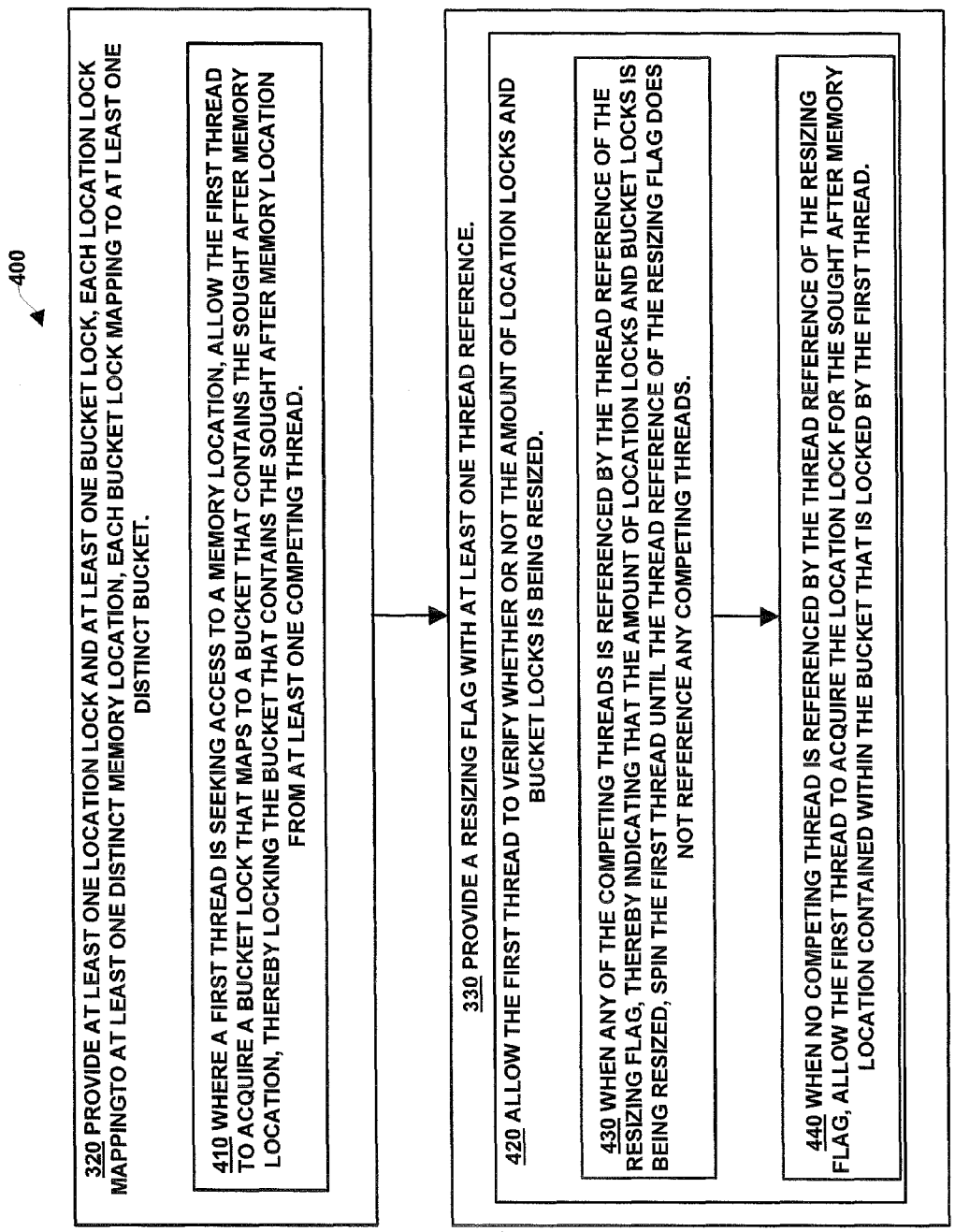
FIG. 4 is a flowchart of processing steps performed by a lock resizer to acquire a location lock for a sought after memory location by a thread according to embodiments herein.

FIG. 4 is a flowchart 400 of processing steps performed by a lock resizer 150 to acquire a location lock for a sought after memory location by a thread according to embodiments herein. At step 410, where a first thread is seeking access to a memory location, the lock resizer 150 allows the first thread to acquire a bucket lock that maps to a bucket that contains the sought after memory location. Once the first thread acquires the bucket lock, it thereby locks that bucket from being accessed by any competing threads.

At step 420, the lock resizer 150 allows the first thread to verify whether or not the amount of location locks and bucket locks are being resized. The lock resizer 150 implements such a verification to ensure that threads holding locks will "know" if the locks are still valid (i.e. up-to-date). In other words, if a thread were to use a lock without verifying that resizing is (or isn't) taking place, then there is a risk of the lock giving the thread access to a different bucket and/or memory location. Hence, the thread would not be able access the desired location although even though the lock was valid when it was acquired.

At step 430, when any competing thread is referenced by the resizing flag's thread reference, the lock resizer 150 spins the first thread until the thread reference no longer references any other threads. The first thread spins in order to allow the resizing to be complete, so as to avoid acquiring invalid (i.e. out-of-date) locks. At step 440, once no competing thread is referenced, the lock resizer 150 then allows the first thread to acquire the location lock for the sought after memory location that is located within the locked bucket.

FIG. 5 is a flowchart 500 of processing steps performed by a lock resizer to reacquire a location lock by a thread after the thread has released the locations lock according to embodiments herein. At step 510, upon acquiring the location lock for the sought after memory location, the lock resizer 150 initiates a second verification to determine if location and bucket locks are being resized a competing thread(s). In other words, the lock resizer 150 again checks if the location and bucket locks underwent any resizing while the first thread acquired the location lock. If the thread reference is referencing a particular thread(s), then the first thread "knows" that the location and bucket locks are being resized—and that there is a possibility that the recently acquired lock may be remapped during the current lock resizing.

At step 520, the lock resizer 150 requires the first thread to release the acquired location lock if the second verification determines that a competing thread(s) is referenced by the resizing flag's thread reference. At step 530, after releasing the acquired location lock, the lock resizer 150 allows the first thread to attempt to reacquire the released location lock. In particular, the first thread will seek to acquire the location lock that currently maps to the sought after memory location. At step 540, when no competing thread is referenced by the resizing flag's thread reference, the location lock for the sought after memory location is reacquired by the first thread.

However, while the first thread reacquired the location lock, the lock resizer 150 needs to again confirm that other threads have not initiated lock resizing, Hence, at step 550, the lock resizer 150 spins the first thread until the thread reference of the resizing flag does not reference any competing threads. Once no competing thread(s) is referenced by the resizing flag's thread reference, the lock resizer 150 allows the first thread to read the memory location that is mapped from the "reacquired" location lock.

With regard to the steps of FIGS. 3, 4, and 5 herein discussed, the lock resizer 150 can be implemented in the context of a closed address hash table. As shown in computer code below, the resizing flag (AtomicMarkableReference<Thread> owner) introduces an owner field that combines a Boolean value with a reference to a thread.

```
public     class     RefinableHashSet<T>     extends
BaseHashSet<T>{
  AtomicMarkableReference<Thread> owner;
  volatile ReentrantLock[ ] locks;
  public RefinableHashSet(int capacity) {
  super(capacity);
  locks=new ReentrantLock[capacity];
  for (int i=0; i<capacity; i++) {
    locks [i]=newReentrantLock( );
  }
owner=new     AtomicMarkableReference<Thread>(nult,
false);
```

Normally, the Boolean value is false, meaning that the set (i.e. number of location and bucket locks) is not being resized. While a resizing is in progress, however, the Boolean value is true, and the associated reference indicates the thread(s) that is in charge of resizing. Additional computer code is further provided to illustrate an embodiment of the lock resizer 150 acquiring locks and checking for indications of resizing.

```
public void acquire (T x) {
    boolean[ ] mark={true};
    Thread me=Thread. currentThread( );
    Thread who;
    while (true) {
      do { // wait until not resizing
          who=owner.get(mark);
      } while (mark[0] &.&. who !=me);
      ReentrantLock[ ] oldLocks=this. locks;
      ReentrantLock oldLock==oldLocks[x.hashCode( ) % old-
          Locks.length];
      oldLock.lock( ); // acquire lock
      who=owner.get(mark);
      if ((! mark[0] U who==me) &.&. this.locks==oldLocks) {
          // recheck
          return;
      } else { // unlock & try again
          oldLock. unlock ( );
      }
    }
} public void release (T x) {
    locks[x.hashCode( ) % locks.length].unlock( );
}
```

Each method (i.e. thread) locks the bucket for x by calling acquire(a;) and spins, until no other thread is resizing the locks, and then reads the lock array (i.e. the number of location and/or bucket locks). It then acquires the item's lock (i.e. location lock) and again checks for any lock resizing while holding the item's lock to make sure no other thread is currently resizing the locks and that no resizing took place between Lines 30 and 35 (of Page 10). If no resizing is taking place (or took place while acquiring the item's lock), the thread can proceed to access the item (i.e. read the memory location).

However, due to resizing from a competing thread, the acquired lock may no longer properly map to the desired memory location, so the thread holding the lock will release and attempt to reacquire the "updated" lock for the item. Before attempting to acquire the lock(s) again, the thread will spin until the current resize completes (Lines 27-29, Page 10).

Figure 6:
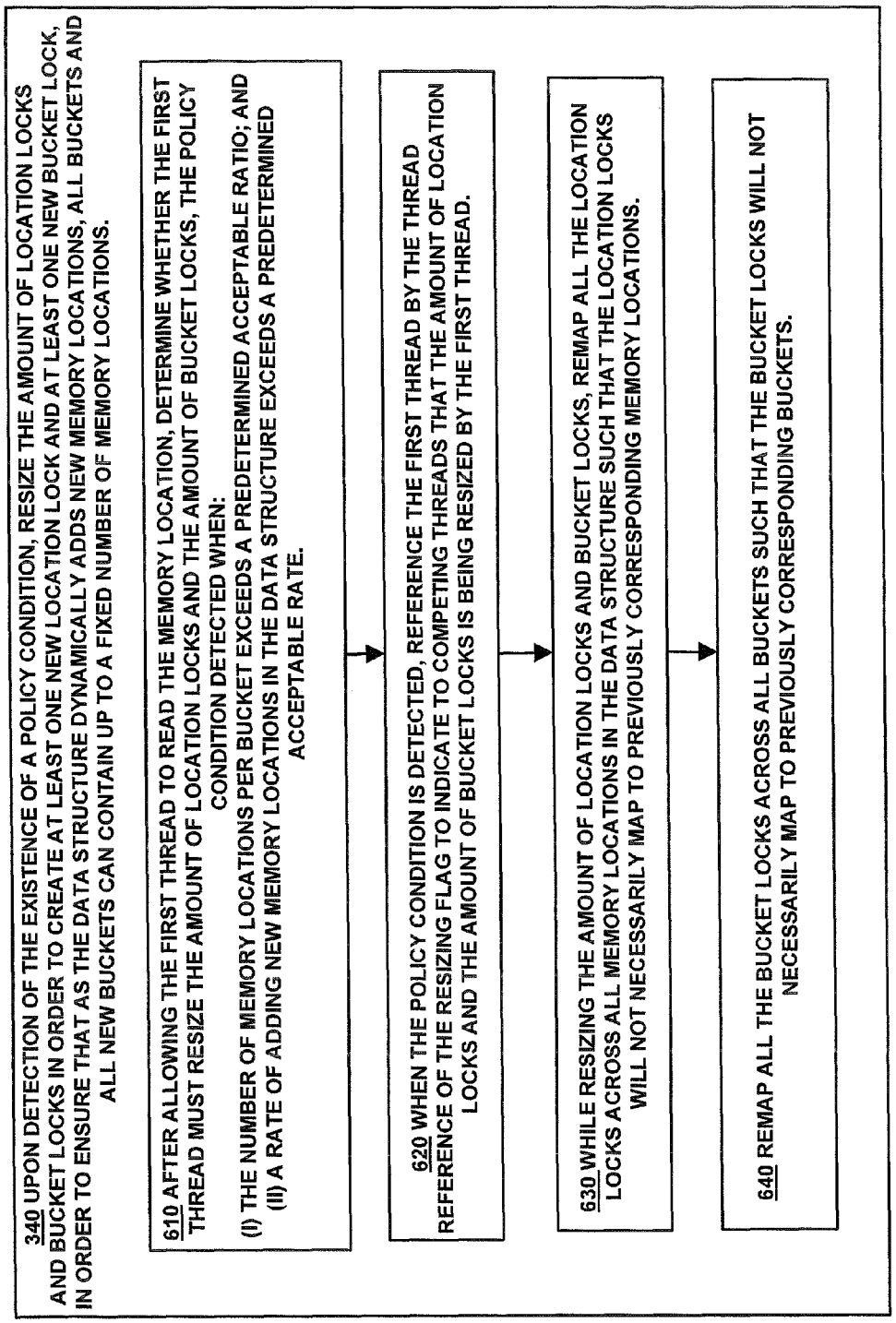
FIG. 6 is a flowchart of processing steps performed by a lock resizer to resize bucket locks and location locks according to embodiments herein.

FIG. 6 is a flowchart 600 of processing steps performed by a lock resizer 150 to resize bucket locks and location locks according to embodiments herein. At step 610, after allowing the first thread to read the memory location, the lock resizer 150 determines whether the first thread must resize the amount of location locks and the amount of bucket locks. The lock resizer 150 will resize the locks when a policy condition is detected. The policy condition can arise when (i) the number of memory locations per bucket exceeds a predetermined acceptable ratio and/or (ii) when the rate of adding new memory locations in the data structure exceeds a predetermined acceptable rate.

Once the policy condition is detected, at step 620, the lock resizer 150 sets the resizing flag to reference the first thread. The resizing flag can then be used by competing threads to check whether the first thread has completed lock resizing. At step 630, while the first thread resizes the locks, the lock resizer 150 allows for the locks to be remapped. The location and bucket locks can be remapped across all memory locations in the data structure. Hence, once lock resizing is complete, certain locks will not necessarily map to memory locations (and/or buckets) to which they previously mapped.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
    providing, in a memory unit, a data structure with at least one memory location, the data structure apportioned according to at least one bucket, each bucket containing a plurality of the memory locations, the data structure further dynamically adding at least one new memory location;
    providing, using a processor, at least on location lock and at least on bucket lock, each location lock mapping to a distinct memory location, each bucket lock mapping to at least one distinct bucket;
    providing, using a processor, a resizing flag with at least one thread reference; and
    upon detection of the existence of a policy condition, resizing, using the processor, the amount of location locks and bucket locks in order to create at least one new location lock and at least one new bucket lock.

2. The method as in claim 1, wherein providing at least one location lock and at least one bucket lock, each location locks mapping to a distinct memory location, each bucket lock mapping to at least one distinct bucket includes:
    where a first thread is seeking access to one of the memory locations, allowing the first thread to acquire a bucket lock that maps to a bucket containing the sought after memory location and locking the bucket that contains the sought after memory location from at least one competing thread.

3. The method as in claim 1, wherein providing the resizing flag with the thread reference includes:
    allowing the first thread to verify whether or not the amount of location locks and bucket locks is being resized, which comprises:
        spinning the first thread until the thread reference of the resizing flag does not reference any competing thread; and
        when no competing thread is referenced by the thread reference of the resizing flag, allowing the first thread to acquire the location lock for the sought after memory location contained within the bucket that is locked by the first thread.

4. The method as in claim 3, wherein allowing the first thread to acquire the location lock for the sought after memory location contained within the bucket that is locked by the first thread includes:
    upon acquiring the location lock for the sought after memory location, initiating a second verification to determine if the amount of location locks and bucket locks is being resized by any competing thread; and
    if the second verification determines that any competing thread is referenced by the thread reference of the resizing flag, requiring the first thread to release the location lock acquired by the first thread.

5. The method as in claim 4, wherein requiring the first thread to release the location lock acquired by the first thread includes:
    after releasing the acquired location lock, allowing the first thread to reacquire the location lock for the sought after memory location.

6. The method as in claim 5, wherein allowing the first thread to reacquire the location lock for the sought after memory location includes:
    reinitiating the second verification to verify if any competing thread is referenced by the thread reference of the resizing flag;
    spinning the first thread until the thread reference of the resizing flag does not reference any competing threads; and
    when no competing thread is referenced by the thread reference of the resizing flag, reacquiring the location lock for the sought after memory location.

7. The method as in claim 4, wherein initiating the second verification to determine if the amount of location locks and bucket locks is being resized by any competing thread includes:
    when no competing thread is referenced by the thread reference of the resizing flag, allowing the first thread to read the memory location mapped from the acquired location lock.

8. The method as in claim 1, wherein upon detection of the existence of the policy condition, resizing the amount of location locks and the amount of bucket locks associated with the data structure to create at least one new location lock and at least one new bucket lock includes:
    after allowing the first thread to read the memory location by the first thread, determining whether the first thread must resize the amount of location locks and the amount of bucket locks, the policy condition detected when:
(i) a number of memory locations per bucket exceeds a predetermined acceptable ratio; and
(ii) a rate of adding new memory locations in the data structure exceeds a predetermined acceptable rate.

9. The method as in claim 8, further comprising:
when the policy condition is detected, referencing the first thread at the thread reference of the resizing flag to indicate to competing threads that the amount of location locks and bucket locks is being resized by the first thread;
while resizing the amount of location locks and bucket locks, remapping all the location locks across all memory locations in the data structure; and
remapping all the bucket locks across all memory locations in the data structure.

10. A computer system comprising:
a processor;
a memory unit that stores instructions associated with an application executed by the processor; and
an interconnect coupling the processor and the memory unit, enabling the computer system to execute the application and perform operations of:
providing a data structure with at least one memory location, the data structure apportioned according to at least one bucket, each bucket containing a plurality of the memory locations, the data structure further dynamically adding at least one new memory location;
providing at least on location lock and at least on bucket lock, each location lock mapping to a distinct memory location, each bucket lock mapping to at least one distinct bucket;
providing a resizing flag with at least one thread reference; and
upon detection of the existence of a policy condition, resizing the amount of location locks and bucket locks in order to create at least one new location lock and at least one new bucket lock.

11. A non-transitory computer readable medium comprising executable instructions encoded thereon for use by a computerized device to perform processing comprising:
instructions for providing a data structure with at least one memory location, the data structure apportioned according to at least one bucket, each bucket containing a plurality of the memory locations, the data structure further dynamically adding at least one new memory location;
instructions for providing at least on location lock and at least on bucket lock, each location lock mapping to a distinct memory location, each bucket lock mapping to at least one distinct bucket;
instructions for providing a resizing flag with at least one thread reference; and
instructions for resizing the amount of location locks and bucket locks, upon detection of the existence of a policy condition, in order to create at least one new location lock and at least one new bucket lock.

12. The computer readable medium as in claim 11, wherein the instructions for providing at least one location lock and at least one bucket lock, each location locks mapping to a distinct memory location, each bucket lock mapping to at least one distinct bucket include:
where a first thread is seeking access to one of the memory locations, instructions for allowing the first thread to acquire a bucket lock that maps to a bucket containing the sought after memory location and locking the bucket that contains the sought after memory location from at least one competing thread.

13. The computer readable medium as in claim 11, wherein the instructions for providing the resizing flag with the thread reference include:
instructions for allowing the first thread to verify whether or not the amount of location locks and bucket locks is being resized, which comprises:
instructions for spinning the first thread until the thread reference of the resizing flag does not reference any competing thread; and
when no competing thread is referenced by the thread reference of the resizing flag, instructions for allowing the first thread to acquire the location lock for the sought after memory location contained within the bucket that is locked by the first thread.

14. The computer readable medium as in claim 13, wherein the instructions for allowing the first thread to acquire the location lock for the sought after memory location contained within the bucket that is locked by the first thread include:
upon acquiring the location lock for the sought after memory location, instructions for initiating a second verification to determine if the amount of location locks and bucket locks is being resized by any competing thread; and
if the second verification determines that any competing thread is referenced by the thread reference of the resizing flag, instructions for requiring the first thread to release the location lock acquired by the first thread.

15. The computer readable medium as in claim 14, wherein the instructions for requiring the first thread to release the location lock acquired by the first thread include:
after releasing the acquired location lock, instructions for allowing the first thread to reacquire the location lock for the sought after memory location.

16. The computer readable medium as in claim 15, wherein the instructions for allowing the first thread to reacquire the location lock for the sought after memory location include:
instructions for reinitiating the second verification to verify if any competing thread is referenced by the thread reference of the resizing flag.

17. The computer readable medium as in claim 16, wherein the instructions for reinitiating the second verification to verify if any competing thread is references by the thread reference of the resizing flag include:
instructions for spinning the first thread until the thread reference of the resizing flag does not reference any competing threads; and
when no competing thread is referenced by the thread reference of the resizing flag, instructions for reacquiring the location lock for the sought after memory location.

18. The computer readable medium as in claim 14, wherein the instructions for initiating the second verification to determine if the amount of location locks and bucket locks is being resized by any competing thread include:
when no competing thread is referenced by the thread reference of the resizing flag, instructions for allowing the first thread to read the memory location mapped from the acquired location lock.

19. The computer readable medium as in claim 11, wherein the instructions for resizing the amount of location locks and the amount of bucket locks associated with the data structure to create at least one new location lock and at least one new bucket lock include:
after allowing the first thread to read the memory location by the first thread, instructions for determining whether the first thread must resize the amount of location locks and the amount of bucket locks, the policy condition detected when:
  (i) a number of memory locations per bucket exceeds a predetermined acceptable ratio; and
  (ii) a rate of adding new memory locations in the data structure exceeds a predetermined acceptable rate.

20. The computer readable medium as in claim 19, further comprising:
  when the policy condition is detected, instructions for referencing the first thread at the thread reference of the resizing flag to indicate to competing threads that the amount of location locks and bucket locks is being resized by the first thread;
  while resizing the amount of location locks and bucket locks, instructions for remapping all the location locks across all memory locations in the data structure; and
  instructions for remapping all the bucket locks across all memory locations in the data structure.

* * * * *

UNITED STATES PATENT AND TRADEMARK OFFICE
CERTIFICATE OF CORRECTION

| | |
|---|---|
| PATENT NO. | : 7,809,916 B1 |
| APPLICATION NO. | : 11/863901 |
| DATED | : October 5, 2010 |
| INVENTOR(S) | : Nir N. Shavit et al. |

It is certified that error appears in the above-identified patent and that said Letters Patent is hereby corrected as shown below:

Column 12, line 44, Claim 17:

Delete "references" and insert -- referenced --.

Signed and Sealed this

Seventh Day of December, 2010

David J. Kappos
*Director of the United States Patent and Trademark Office*